June 16, 1953 — E. J. COFFEY ET AL — 2,642,106
FRUIT JUICE EXTRACTION MECHANISM
Filed Dec. 22, 1950 — 3 Sheets-Sheet 1

INVENTORS
EDWARD J. COFFEY
PAUL E. FISCHER
BY *William C. Babcock* ATTORNEY

INVENTORS
EDWARD J. COFFEY
PAUL E. FISCHER
BY *William C. Babcock* ATTORNEY

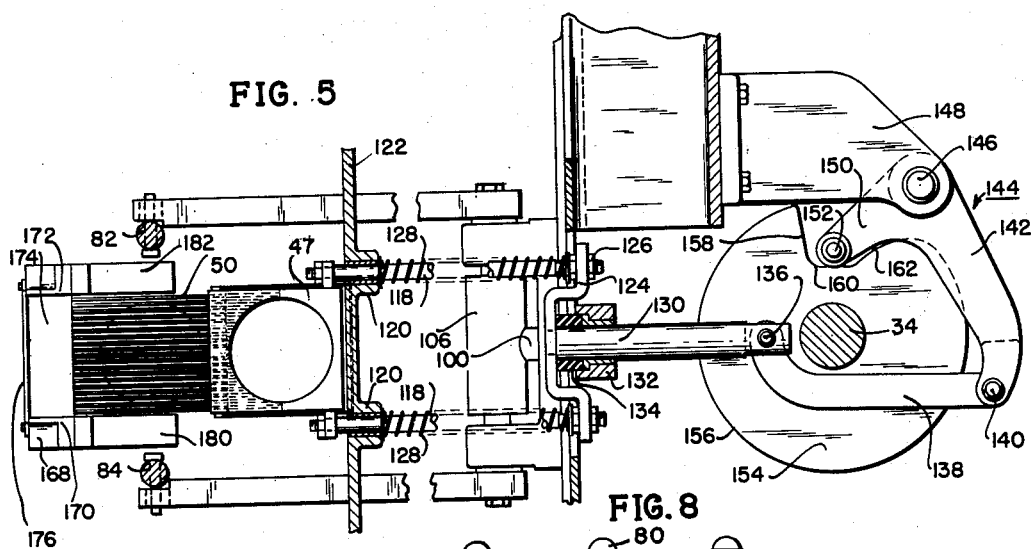

Patented June 16, 1953

2,642,106

UNITED STATES PATENT OFFICE 2,642,106

FRUIT JUICE EXTRACTION MECHANISM

Edward J. Coffey and Paul E. Fischer, Minneapolis, Minn., assignors to General Mills, Inc., a corporation of Delaware Application December 22, 1950, Serial No. 202,325

17 Claims. (Cl. 146—3)

The present invention relates to fruit juice extraction mechanism and more particularly to an improved device for efficient separation of the juice from the pulp in such a machine.

While the mechanism of the present invention is particularly designed for use with a fruit juicing machine of the type in which fresh citrus fruit is halved and the respective halves reamed by a suitable extraction head to remove the juice and pulp from the skins, it will be apparent from the following description that certain features of the invention are capable of more general application in any case where a pressing or squeezing operation is desirable to separate the juice from the extracted pulp of a fruit or vegetable.

It is accordingly one object of the present invention to provide an improved juice extraction press.

It is another object to provide a juice extraction press particularly adapted for use in automatic fruit juice vending and dispensing machines.

A further object is the provision of an improved juice extraction press which is automatically cleaned at the end of a given cycle of extraction.

Another object is to provide a juice extraction press in combination with a reaming device and mechanism for removal of waste pulp after the extraction operation, in which the reaming device, press, and waste removal mechanisms are actuated by common operating means in timed sequence.

Other objects and advantages of the invention will be apparent from the following specification in which a preferred form of the invention is described.

In the drawings which form a part of this specification,

Fig. 5 is a partial top plan of the mechanism shown in Figs. 2 to 4, certain parts being broken away and other parts shown in section for clearness.

Fig. 6 is a partial perspective view of the plup removal mechanism according to the invention.

Fig. 7 is a partial top plan of part of the actuating mechanism for the juice extraction plunger, with portions broken away and other portions shown in section.

Fig. 8 is a partial front elevation showing additional details of the actuating connections for the pulp extraction plunger, and Fig. 9 is a view, similar to Fig. 8, of a modified form of connection.

Figure 1:
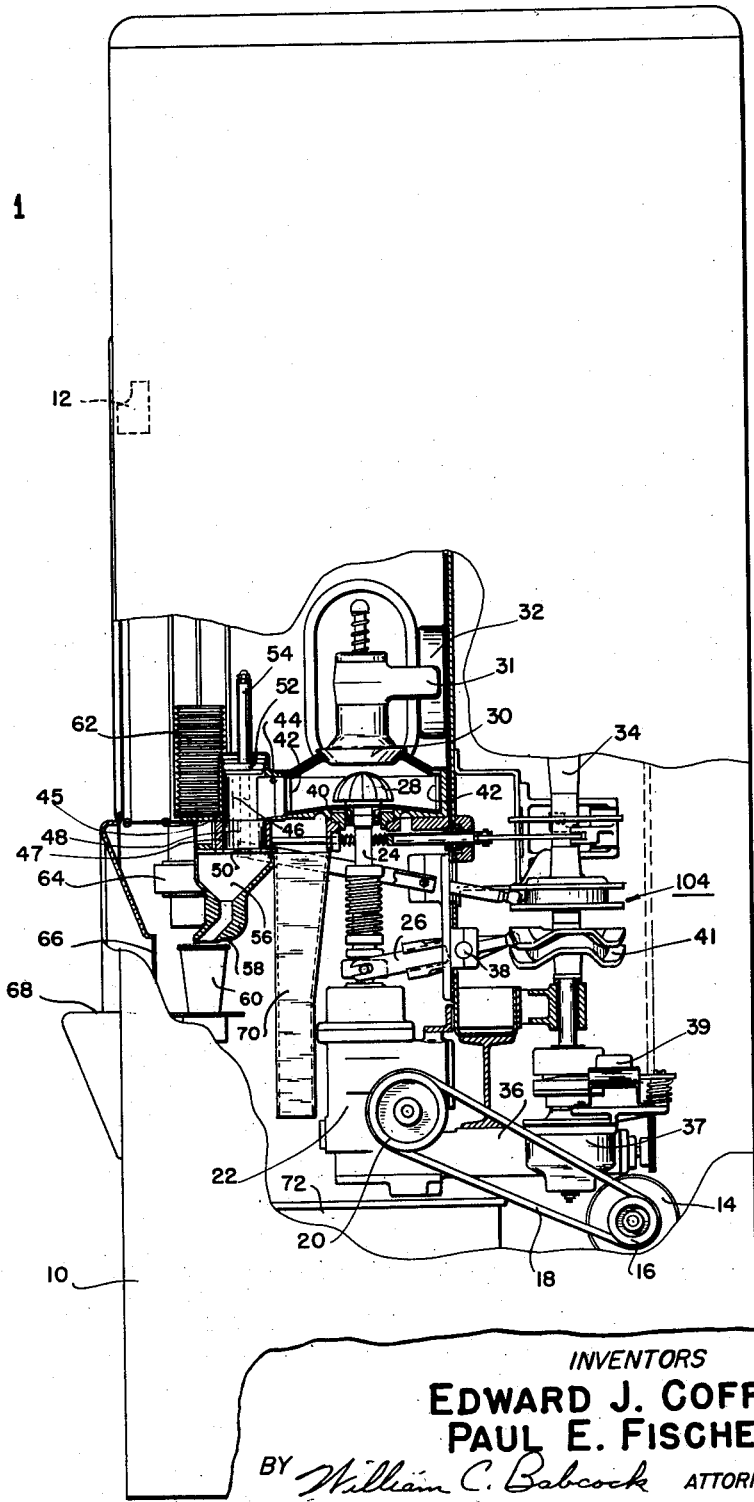
Figure 1 is a side elevation of a coin-operated fruit juice extraction and dispensing machine embodying features of the invention, certain portions of the machine being broken away and other portions being shown in section for clarity.

In the drawings, the present invention has been shown in combination with a coin-operated fruit juice extraction and dispensing machine of the type described and claimed in U. S. Patent 2,365,832 to Monroe. Only those portions of the Monroe machine which are essential to an understanding of the present invention have been included in the present description. By way of general explanation, a machine of this type is designed to operate through a complete cycle in which a piece of citrus fruit, such as a whole orange, is fed from a supply hopper to suitable gripping members. The whole fruit is sliced into two half sections, each of which is retained by one of the gripping members. These half sections are then reamed to remove the juice and pulp from the interior of the skin, and the juice is finally delivered to an individual cup or container which becomes accessible to the operator of the machine at the termination of the cycle. While the machine of the above patent included a strainer for separation of the juice from the pulp after the reaming operation, no means was provided for pressing all the juice from the pulp. Thus a certain portion of the juice normally available in a given piece of fruit was wasted during operation of the machine.

In general, the objects of the present invention are accomplished by provision of a plunger or press to squeeze and compress the pulp and thereby extract substantially all the available juice therefrom. The present invention also includes novel mechanism for automatically cleaning the juice extraction press by removal of the compressed pulp at the end of the operation.

With reference to Fig. 1, the juice extraction mechanism is housed in a cabinet 10. A coin slot 12 is provided for insertion of a coin to start the operation of the machine through a complete extraction and dispensing cycle in known manner. Insertion of the proper coin or coins in slot 12 causes energization of the power source such as electric motor 14.

The driving pulley 16 of motor 14 is operably connected by a belt 18 to a driven pulley 20 on a gear box or power transfer case 22. A vertical shaft 24 is operatively driven from gear box 22 under the control of a suitable clutch lever 26. A reamer 28 is mounted at the upper end of shaft 24 for engagement with the fruit to be reamed. A half orange, or other fruit, is held in position for reaming by a clamping member 30 which is carried by a supporting arm 31 connected to a hub 32 mounted for rotation around a horizontal axis. The position of the fruit holding member 30 is controlled by suitable connection with a vertical cam shaft 34. Since these particular connections form no part of the present invention, they are not described here.

Cam shaft 34 is driven through a horizontal take-off 36 from gear box 22 through reduction gearing 37. The gear ratio is so chosen that shaft 34 makes one complete cycle for each operating cycle of the machine. Motor 14 is then deenergized by suitable switch mechanism designated generally as 39 operated by cam shaft 34 at the end of its complete cycle.

The reamer clutch lever 26 is pivoted to a suitable frame member at 38 and is shifted about the pivot by a cam 41 on shaft 34. Thus during rotation of shaft 34 through one complete revolution, the clutch lever 26 is raised to elevate the reamer 28 against the fruit held by member 30 and thus ream the juice and pulp out of the skin of the fruit. If desired, the clutch member 26 may include connections as described in the above patent so that the reamer 28 is rotated at relatively low speed in its upper reaming position, and is then rotated at relatively higher speed as it returns to the position of Fig. 1 in order to clean the reamer and associated parts by centrifugal force.

Surrounding the reamer 28 is a juice collecting housing which includes a bottom plate 40 fixed to shaft 24 and rotating with the reamer 28. A series of spaced vertical vanes 42 carried by the rotary plate 40 sweeps the juice and pulp from the juice collecting housing through a passageway 44 into the vertical cylindrical bore 46 of a juice extraction press. This press includes an upper stationary member 45 in which the cylindrical bore or plunger chamber 46 is located, in combination with a lower movable section 47 which likewise has a vertical cylindrical bore or pressing chamber 48 normally aligned with the portion 46 of the stationary member 45.

At the lower end of the juice extraction press a series of spaced strainer bars 50 collects and retains the pulp and seeds thrown into the press through the passageway 44 during the reaming operation. A plunger 52 is reciprocated vertically through the aligned cylindrical sections 46 and 48 by means of an actuating rod 54. Downward movement of plunger 52 toward the strainer elements 50 compresses the pulp and squeezes the juice into a hopper 56 from which it passes by a spout 58 into an individual cup or container 60.

Cups 60 are supplied individually by suitable feeding mechanism from a supply stack 62 which may be contained in an ordinary cup dispenser 64. Once the cup 60 has been filled, it becomes accessible to the user of the machine through an opening 66 in the front of the casing. Suitable mechanism (not shown) may be provided to push the cup 60 through opening 66 onto an externally accessible platform 68.

After the plunger 52 has squeezed the juice from the pulp and has been at least partially retracted in an upward direction to clear the movable lower section 47, this section is moved laterally by mechanism to be described below so that it scrapes the compressed pulp from the strainer element 50 and discharges the pulp into a waste chute 70 through which it is deposited in receptacle 72 at the bottom of the machine.

*Details of pulp pressing mechanism*

Figure 2:
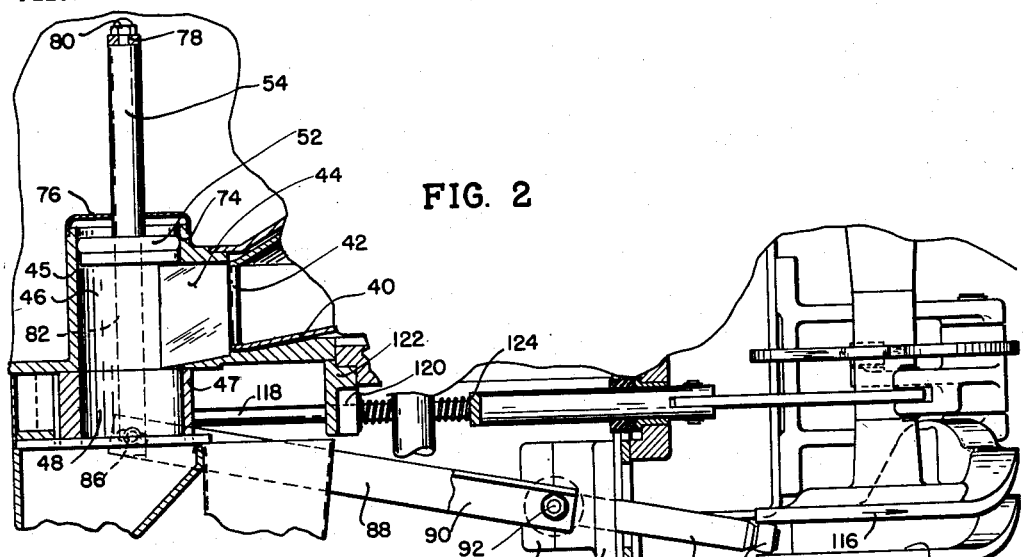
Fig. 2 is an enlarged partial view of a portion of the mechanism of Fig. 1, with the juice extraction press in its retracted or inactive position.
Figure 3:
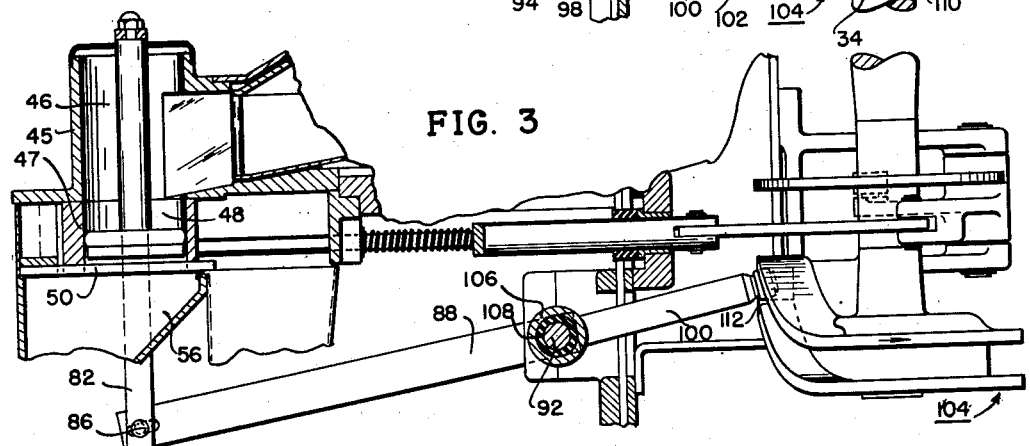
Fig. 3 is a view similar to Fig. 2, but with the juice extraction plunger in the operative position in which it effectively compresses the pulp to remove the juice.
Figure 4:
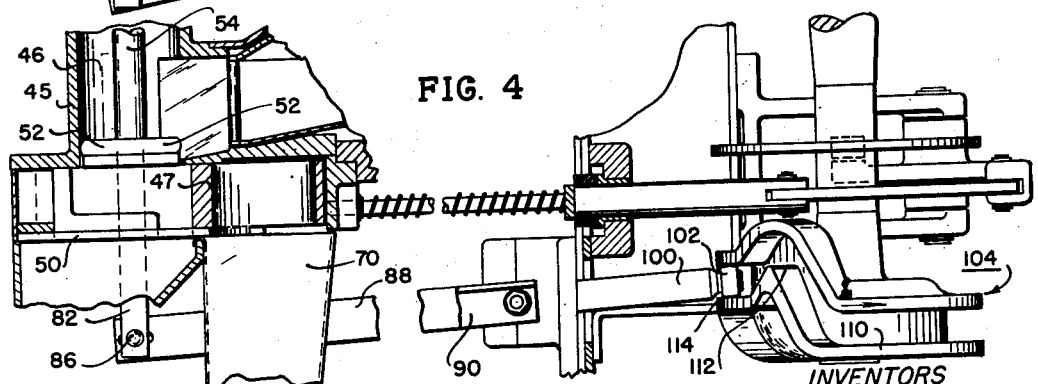
Fig. 4 is a view similar to Figs. 2 and 3, but with the juice extraction plunger in partially retracted position and the pulp plating mechanism in its operative position.

As shown in Figs. 2 to 4, the upper stationary section 45 of the juice extraction press includes an upper portion 74 which projects upwardly above the passage 44 throught which juice and pulp are fed from the juice collecting housing. Plunger 52, in its uppermost position of Fig. 2, is located within this upper section 74 of member 45 in order that all portions of the plunger 52 will be above the passage 44 to prevent interference with the free discharge of the fruit pulp from the reamer section of the machine. A top cover 76 for portion 74 helps to exclude air from this portion of the machine and also serves as a guide for the plunger actuating rod 54.

The mechanism by which the plunger 52 and rod 54 are reciprocated vertically includes a horizontal crossbar 78 to which the top of rod 54 is connected by a bolt 80. The ends of crossbar 78 are operatively connected to vertical lifting links 82 and 84, respectively, as shown in detail in Fig. 8.

The lower ends of links 82 and 84 are pivotally connected at 86 (Figs. 2–4) to a pair of lever arms 88 and 90 respectively. As shown in Fig. 7, lever arms 88 and 90 are rigidly mounted at the ends of a horizontal shaft 92 so as to rotate with shaft 92.

Shaft 92 in turn is mounted in bearing extensions 94 and 96 of a suitable frame member 98. An operating lever 100 is rigidly connected to a cylindrical sleeve 106 forming part of a torsion or resilient drive for shaft 92. Between cylindrical portion 106 and shaft 92 a rubber or other resilient section 108 provides the desired torsion connection in known manner. Thus the movements of actuating lever 100 will normally be transmitted to the shaft 92 to cause rotation of lever arms 88 and 90 and vertical reciprocation of plunger 52. However, should the plunger 52 encounter any unexpected obstacles such as large seeds or particles of foreign matter, the torsion connection 108 would permit the plunger 52 to stop, before the movement of actuating lever 100 was complete, so that damage to the parts would be avoided.

In place of the resilient torsion connection shown in Fig. 7 and the rigid connection of Fig. 8, the modified construction shown in Fig. 9 may be used. In this case the crossbar 78, which drives plunger rod 54, is connected at its ends to modified vertical lifting links 282 and 284, which are identical. These links are of hollow cylindrical construction and carry internal axially slidable shafts 286. A spring 288 is located between the shaft end 286 and the end 290 of member 282 to resist longitudinal movement of the shaft 286 out of the link.

The lower end of the shaft 286 is enlarged at 292 and pivoted to the end of lever arm 88 at 294. Thus when the lever arm 88 moves downwardly, the shaft 286 and link 282 will normally follow it and push the plunger rod 54 to squeeze the pulp. If seeds or other objects obstruct the movement of the plunger 52, spring 288 will permit the plunger to stop even though lever end 88 has not reached its lowest point. Thus damage to the actuating connections is avoided.

When the modified linkage of Fig. 9 is used, the construction shown in Fig. 7 may be modified to omit the resilient torsion member 108 and connect both the levers 88 and 90 as well as operating lever 100, rigidly to shaft 92.

Actuating lever 100 carries a cam roller 102 (Figs. 2–4) at its outer end for engagement with a cam 104 on shaft 34. Cam 104 includes three portions designated as 110, 112, and 114 respectively. Portion 110 is the lower or flat portion which extends around a major portion of the circumference of the cam and maintains the parts in the position of Fig. 2 during operation of the reamer 28. As the reaming operation is completed, the high portion 112 of cam 104 comes into engagement with roller 102 and moves the parts to the position of Fig. 3, in which plunger 52 is forced downwardly to squeeze the pulp against the strainer bars 50 and thus force the juice from it.

Further rotation of shaft 34 brings the intermediate portion 114 of cam 104 into engagement with roller 102 and retracts the plunger to the position of Fig. 4 in which the bottom of plunger 52 is substantially flush with the lower end of stationary press section 45. In this position the lower face of plunger 52 can be scraped clean of pulp by the mechanism described below.

At the conclusion of the cleaning portion of the cycle, further rotation of shaft 34 in the direction of arrow 116 again brings the lower portion 110 of the cam 104 into engagement with roller 102 to return the parts to the position of Fig. 2 in preparation for a succeeding reaming operation.

Details of strainer cleaning mechanism

As shown particularly in Figs. 5 and 6, the movable section 47 of the juice extraction press is substantially square in outer cross section and is provided with a pair of lateral projections or ears 117 which are connected to operating rods 118 by nuts 119. These rods 118 are slidably mounted in enlarged bearing portions 120 of a stationary frame member 122 of the machine. Rods 118 extend toward the rear of the machine, i. e., toward the cam shaft 34, and are connected at their rear ends to a cross member 124 by nuts 126. Springs 128, mounted on shafts 118 between the bearing portions 120 and the cross member 124 normally urge the cross member and rods rearwardly toward the cam shaft so as to pull the housing portion 47 into the position of Figs. 4 and 5. In this position, the cylindrical bore or pressing chamber 48 of housing section 47 is in alignment with the waste chute 70, so that the pulp and seeds which remain after the pressing operation are moved laterally by housing 47 and dumped into the waste chute.

A rod 130 is rigidly connected to the intermediate portion of cross bar 124 and is slidably mounted in a bearing portion 132 on one of the frame members. A resilient cushion or shock absorber 134 is located between cross member 124 and bearing portion 132 to cushion the rearward movement of the cross member 124, rods 118, and housing section 47.

In order to hold the housing section 47 at the front of the machine in the position of Figs. 1 to 3, inclusive, the following linkage is provided. A link 138 is pivoted at 136 to the actuating rod 130 and is also pivoted at 140 to the long arm 142 of a bell crank 144. Bell crank 144 is pivoted at 146 to a bearing 148 on the main frame of the machine. The short arm 150 of bell crank 144 carries a cam roller 152 for engagement with the periphery of a cam 154 on cam shaft 34. The periphery of cam 154 includes a major portion of constant radius 156 which is designed to engage roller 152 and rock the bell crank 144 so as to move the housing section 47 to the position of Figs. 1 to 3.

At one point on cam 154, a sharp drop-off 158 is provided. As this portion of the cam passes roller 152, the roller is permitted to move inwardly to the position of Fig. 5 under the action of springs 128. This inward movement of roller 152 is limited by an inner cam portion 160 immediately adjacent the drop-off 158. A smooth inclined section of the cam 162 connects the portions 160 and 156 so that continued rotation of shaft 34 and cam 154 gradually restores the parts to the position of Figs. 1 to 3 in preparation for the next operation of the juice extraction press.

As shown in Figs. 5 and 6, the lower wall against which the pulp is compressed includes strainer elements 50 in the form of spaced parallel bars or rods which extend along the direction of movement of the housing portion 47. Section 47, in turn, has a series of parallel depending ribs 164 on its lower face 166. The width of these ribs and the distance between them are so chosen that ribs 164 closely fit the spaces between strainer elements 50. Ribs 164 extend over only half the lower surface 166 of housing section 47 and the length of the individual ribs varies in order that the ribs may terminate flush with the cylindrical bore 48 of the section 47. The strainer elements 50 and ribs 164 accordingly serve as additional guides for the longitudinal movement of the section 47 under the influence of springs 128 and cam 154. At the same time, neither elements 50 nor ribs 164 project across the cylindrical bore 48 when section 47 is moved to the waste removal position of Fig. 5.

A study of the figures clearly indicates that all pulp, seeds and foreign matter which are located within the cylindrical bore 48 between strainer elements 50 and plunger 52 when the latter is in the intermediate position of Fig. 4, will be displaced laterally during the movement of housing 47 for discharge into the waste chute 70. Thus the upper and outer edges of the cylindrical bore 48 at the top of element 47 will pass immediately across the lower face of plunger 52 to scrape the adhering particles of pulp and other material from the end of the plunger.

Similarly the lower edge of the cylindrical bore 48 will scrape such material from the upper surface of the strainer elements 50, while the ribs 164 which mesh with the strainer elements 50 will force similar particles of material laterally along the space between the strainer elements until such particles are discharged above the chute 70. This scraping action of the space between strainer elements 50 is, of course, due primarily to the action of the inner ends 165 of ribs 164.

Obviously, this same cleaning action can be obtained by a single short projection fitting the space between the strainer elements 50 instead of the relatively long ribs shown at 164. However, it is preferable to extend these projections or ribs to the front edge 167 of housing section 47 in order that a substantial portion of ribs 164 will remain in interlocking engagement with elements 50 when section 47 is moved all the way to the cleaning position of Figs. 4 and 5.

As best shown in Figs. 5 and 6, strainer elements 50 are formed as integral extensions on a housing plate member 168. Member 168 has upwardly extending side walls 170 and 172, the inner faces of which are spaced corresponding to the width of the housing section 47. Thus a space 174 (Fig. 5) is provided between the portions 170 and 172. A front plate 176, held in place by bolts 178, closes the space 174 and at the same time permits ready access to this area for cleaning. Additional side guides 180 and 182 extend rearwardly from the portions 170 and 172 of strainer support 168. Housing section 47 is adapted to fit between these side guides 180 and 182 when the section is in the position of Figs. 1 to 3. In this position, the forward face 167 of housing section 47 will lie directly opposite the joint between portion 168 and guides 180 and 182 so that face 167 does not extend over space 174.

The function of this space 174 is to receive any additional particles of fruit pulp or foreign material which might accidentally be deposited on the strainer elements 50 when the housing section 47 is in the cleaning position of Fig. 5. In such case, the forward face 167 of section 47, during the return movement of the section toward the position of Figs. 1, 2, and 3, would push such material forwardly into the space 174 from which it could be removed periodically by disassembly of cover plate 176.

As described in the foregoing specification, a construction has been provided which accomplishes the objects of the invention and which functions in timed sequence to press the desired fruit or equivalent material against a suitable strainer for removal of juice, followed by automatic cleaning of the strainer element in preparation for further cycles of operation. The various portions of the mechanism are driven by the common power source 14.

Since minor variations and changes in the exact details of construction will be apparent to persons skilled in this field, it is intended that this invention shall cover all such changes and modifications as fall within the spirit and scope of the attached claims.

Now, therefore, we claim:

1. A fruit juice extraction unit comprising a housing having a pressing chamber, a plunger movable axially therein, a stationary wall at one end of the chamber against which the plunger compresses the fruit to be extracted, a waste outlet, cleaning means in the chamber movable laterally across said wall to convey the pressed fruit into the waste outlet, and driving means connected to said plunger and cleaning means and actuating them in predetermined timed sequence.

2. A fruit juice extraction unit comprising a housing having a pressing chamber, a plunger movable axially therein, a stationary wall at one end of the chamber against which the plunger compresses the fruit to be extracted, a juice outlet at the bottom of the chamber, a waste outlet offset from the juice outlet, cleaning means in the chamber movable laterally across said wall to convey the pressed fruit into the waste outlet, and driving means connected to said plunger and cleaning means and actuating them in predetermined timed sequence.

3. A fruit juice extraction unit comprising a housing having a pressing chamber, a stationary wall at one end of the chamber against which the fruit is compressed, a plunger mounted in the chamber for axial movement toward and away from the wall, the chamber having a movable section immediately adjacent the wall mounted for scraping movement laterally across the wall to clean the latter after operation of the plunger, and driving means connected to the plunger and the movable section and actuating them in predetermined timed sequence.

4. A fruit juice extraction unit according to claim 3 in which the movable section has a portion located immediately adjacent the plunger when the latter is in a retracted position with respect to the wall, said portion being movable across the operative face of the plunger to scrape and clean the latter when the movable section is actuated to clean the wall.

5. A fruit juice extraction unit comprising a housing having a pressing chamber, a stationary strainer element comprising spaced parallel strainer rods extending across one end of the chamber, a plunger mounted in the chamber for axial movement between an operative juice extraction position adjacent the strainer and a retracted cleaning position spaced from the strainer, and a movable cleaning member adjacent the strainer and mounted for scraping movement laterally across the strainer in a direction parallel to the rods, the cleaning member having projections extending between the rods for cleaning the spaces therebetween.

6. A fruit juice extraction unit according to claim 5 in which the cleaning member is located in the chamber between the strainer and the retracted cleaning position of the plunger and has a portion movable across the operative face of the plunger to scrape and clean the latter when the cleaning member is actuated to clean the rods.

7. A fruit juice extraction unit comprising a housing having a pressing chamber, a stationary wall at one end of the chamber against which the fruit is compressed, a plunger movably mounted in the chamber, driving means connected to the plunger and moving it axially of the chamber between an operative pressing position adjacent the wall and a retracted cleaning position spaced away from the wall, a portion of the pressing chamber housing between the wall and the retracted position of the plunger being movable as a unit across the wall and laterally across the operative face of the plunger to scrape and clean the same, and connections between the driving means and the movable housing portion for operating the latter in timed sequence after movement of the plunger to retracted position.

8. A juice extraction unit comprising a stationary housing having a plunger chamber, a movable housing portion having a pressing chamber therein and mounted for movement between a pressing position in which the pressing chamber is axially aligned with the plunger chamber and a laterally offset cleaning position in which the chambers are out of alignment, a stationary wall mounted adjacent the movable housing portion and closing the pressing chamber when the latter is in pressing position, a plunger mounted in the plunger chamber for axial movement between a retracted cleaning position within the plunger chamber and an operative squeezing position within the pressing chamber, the plunger when in squeezing position pressing the fruit against said wall, and driving means connected to the plunger and movable housing portion and actuating the plunger axially from retracted to squeezing position and back to retracted position while the pressing chamber is in pressing position and thereafter moving the pressing chamber laterally from pressing to cleaning position while the plunger is retracted.

9. A juice extraction unit according to claim 8 having a yielding connection between the driving means and plunger for resilient movement of the plunger to squeezing position.

10. A juice extraction unit according to claim 8 in which the driving means includes a spring normally urging the pressing chamber to cleaning position, a cam follower connected to the pressing chamber housing, and a cam normally engaged by the follower and holding the pressing chamber in pressing position, the cam including a recess into which the follower is moved by the action of the spring for resilient movement of the pressing chamber to cleaning position.

11. A juice extraction unit according to claim 8 having a resilient driving connection between the driving means and plunger for resilient movement of the plunger to squeezing position, and also having a yielding connection between the driving means and pressing chamber housing for resilient movement of the latter to cleaning position.

12. A fruit juice machine comprising fruit holding means, reaming means, means for causing relative movement of the holding means and reaming means for removal of pulp and juice from a piece of fruit in the holding means, a housing having a pressing chamber, means feeding the pulp and juice from the reaming means into the pressing chamber, a plunger movable in the chamber, a wall at one end of the chamber against which the plunger compresses the pulp, a cleaning member movable across the wall to remove the pulp, a power source, and driving means connecting the power source to the cleaning member, to the plunger, and to said means for causing relative movement, for operation of the machine in timed sequence to first ream the fruit, then press the pulp and finally actuate the cleaning member.

13. A fruit juice machine according to claim 12 in which said wall against which the plunger compresses the pulp comprises strainer means through which the juice is pressed.

14. A fruit juice machine according to claim 13 in which said strainer means comprises a plurality of closely spaced parallel rods and in which the cleaning member is reciprocable in a direction parallel to and in contact with the rods, said cleaning member having spaced parallel projections extending between the strainer rods and cleaning the space between them as the cleaning member is moved.

15. A fruit juice extraction unit comprising a pressing chamber portion, a strainer member extending across at least part of said chamber portion, the chamber portion and strainer member being mounted for relative lateral movement with respect to each other between an axially aligned pulp pressing position and a separated cleaning position, a pulp squeezing plunger movable axially through the chamber portion toward the strainer member when the parts are in pulp pressing position, and means for causing relative lateral movement of the chamber portion and strainer from pressing to cleaning position.

16. Apparatus according to claim 15 including means automatically cleaning the strainer member when the parts are moved to cleaning position.

17. Apparatus according to claim 15 including interengaging means on the chamber portion and strainer member automatically cleaning the strainer member during relative movement of the parts to cleaning position.

EDWARD J. COFFEY.
PAUL E. FISCHER.

References Cited in the file of this patent

UNITED STATES PATENTS

| Number | Name | Date |
|---|---|---|
| 710,804 | Riel | Oct. 7, 1902 |
| 1,446,091 | Hurt | Feb. 20, 1923 |
| 2,365,832 | Monroe | Dec. 26, 1944 |
| 2,369,305 | Lobasso | Feb. 13, 1945 |